United States Patent
Sing

(10) Patent No.: US 7,147,741 B2
(45) Date of Patent: Dec. 12, 2006

(54) METHOD OF MAKING A LAMINATED STRUCTURAL MEMBER

(75) Inventor: Peter Sing, P.O. Box 1691, McCleary, WA (US) 98557

(73) Assignee: Peter Sing, McClearly, WA (US)

( * ) Notice: Subject to any disclaimer, the term of this patent is extended or adjusted under 35 U.S.C. 154(b) by 0 days.

(21) Appl. No.: 11/058,052

(22) Filed: Feb. 15, 2005

(65) Prior Publication Data

US 2005/0145329 A1    Jul. 7, 2005

Related U.S. Application Data

(62) Division of application No. 10/046,182, filed on Jan. 14, 2002, now Pat. No. 6,890,398.

(51) Int. Cl.
*B32B 37/00* (2006.01)

(52) U.S. Cl. ............ 156/264; 156/182; 156/512; 156/563; 144/344; 144/346; 144/350; 144/351; 144/352; 52/783.1; 52/784.11; 52/793.1; 52/742.1; 52/742.19; 52/793.11

(58) Field of Classification Search ............. 52/783.1, 52/784.11, 793.1, 742.1, 742.19, 793.11, 52/794; 156/182, 254, 256, 264, 512, 517, 156/563; 144/344, 346, 350, 351, 352
See application file for complete search history.

(56) References Cited

U.S. PATENT DOCUMENTS

| | | | | | |
|---|---|---|---|---|---|
| 2,062,590 | A | * | 12/1936 | Lundquist | 156/182 |
| 3,669,789 | A | * | 6/1972 | Utsugi et al. | 156/182 |
| 4,536,427 | A | * | 8/1985 | Kohn | 428/44 |
| 5,057,170 | A | * | 10/1991 | Legrand et al. | 156/73.5 |
| 2004/0037992 | A1 | * | 2/2004 | Hrovath et al. | 428/44 |

* cited by examiner

Primary Examiner—Linda Gray
(74) Attorney, Agent, or Firm—Delbert J Barnard

(57) ABSTRACT

The fundamental technique of the method for making cellular cores is to make stacks of components which are configured such that cutting slices off the stacks produces cellular cores and, when needed, components used in stacks used to produce cellular cores. One of the basic components used in the stacks is termed a ribbed ply which is a ply (thin sheet of material such as wood) with a number of ribs (long thin strips of material such as wood) attached to the ply, parallel to each other. The spaces between the ribs are filled with filler material such as foam plastic, and the cells in the cellular core are filled with the filler material. The filler material is introduced as layers of the material stacked alternately with plies and adhesively attached. Slices of such a stack, sliced parallel to the grain of the plies (if wood) are called ribbed fillers. Stacking ribbed fillers and plies produces a stack having a cross section which, when sliced, produces filled cell cellular cores.

4 Claims, 4 Drawing Sheets

METHOD OF MAKING A LAMINATED STRUCTURAL MEMBER

RELATED APPLICATION

This application is a division of my application Ser. No. 10/046,182, filed Jan. 14, 2002, and entitled METHOD OF MAKING STRUCTURAL CELLULAR CORES SUITABLE TO USE OF WOOD, now U.S. Pat. No. 6,890,398 B2, granted May 10, 2005.

BACKGROUND OF THE INVENTION

The subject of the invention is the field of structures which comprise primarily a core and one or two panels or pieces attach to the core. More particularly, it relates to a method of manufacturing a core from ply sheets and filler sheets.

DESCRIPTION OF THE PRIOR ART

Common examples of structures using cores are (1) solid core doors in which the cores are solid wood and the facing is wood veneer; (2) aircraft structures which comprise metal skins and honey comb plastic cores; and (3) boat hull structures comprising balsa wood cores and fiberglass structural surfaces. Also, foam plastic is a commonly used core material that may be used by itself or as a filler in honey comb cores. The practical and economic utility of each kind of core structure depends on many factors, primarily strength to weight ratio, stiffness to weigh ratio, material costs, manufacturing costs, durability and variety of practical applications.

It has long been known in the art that wooden cores offer significant advantages because of the unique physical properties of wood, such as high strength to weight and high stiffness to weight ratios. However, because of these and other characteristics, wood is not well adapted to any known conventional techniques for making celled cores. Also, making celled cores with known unconventional techniques is considered to be too expensive.

A primary object of the present invention is to provide a method which enables economically acceptable manufacture of cellular cores made of thin plies (e.g. wood) and a filler material. A secondary objective is that the method not involved the making and handling of parts which are small relative to the size of the cellular core.

SUMMARY OF THE INVENTION

Herein, a "ply" is a thin, flat sheet of material. A "rib" is a thin strip of material having its long edges parallel. A "ribbed ply" is a ply with a plurality of ribs each attached at one of their long edges to a ply, spaced apart, parallel to each other and distributed over one face of the ply. A "filler sheet" is a sheet of material having appropriate qualities and dimension for filling the cells of a core produced by the method of the subject convention. A "filler/ply component" is a ply adhesively attached to a filler sheet. A "filler ply stack" is a stack of filler/ply components adhesively attached, forming a stack of alternating plies and filler sheets, to a designated height. A "filler ribbed ply" has filler material between the ribs. A "filled core" is a slice cut off of a stack of filled rib plies.

The ribs on all rib plies have free edges.

In disclosing the subject convention, materials needed are considered to be available so that providing them is not included in the steps of the invention.

The method of making cellular cores according to the present invention comprises the steps of:

Providing a plurality of ply sheets, each having a first side and s second side;

Providing a plurality of filler sheets, one for each ply sheet. Each filler sheet is less dense than the ply sheets and has a first side and a second side;

Adhesively attaching the first sides of the filler sheets to the first sides of the ply sheets, so as to form a plurality of ply sheet/filler sheet members;

Allowing the adhesive to cure;

Forming a stack of said ply sheets/filler sheet members and when so doing, placing the second side of the filler sheets in contact with the second sides of the ply sheets, and adhesively attaching said sides together;

Allowing the adhesive to cure and then slicing the stack perpendicular to the ply sheets, to form a ribbed member composed of ply-sheet ribs and filler material between the ribs;

Making a stack of said rib members and placing a ply-sheet at the top and at the bottom of the stack and between each adjacent ribbed member, and adhesively securing the rib members and ply sheets together;

Allowing the adhesive to cure;

Cutting the stack of said rib members perpendicular to the ribs, so as to create a plurality of cellular core members, each composed of ribs formed by the sliced ply sheets and filler members between the ribs formed by the filler sheets.

The ply sheets can be made from a variety of materials, wood for example, and the filler sheets can be made from a variety of materials, foam plastic being a typical example.

The various features and aspects of the invention can be used together or separately. Also, other objects, advantages and features will become apparent from the description of the best modes set forth below, from the drawings, from the claims and from the principals that are embodied in the specific structures that are illustrated and described.

BRIEF DESCRIPTION OF THE SEVERAL VIEWS OF DRAWINGS

In the drawings, like reference numerals designate like parts throughout the several views, and:

DETAILED DESCRIPTION OF A PREFERRED EMBODIMENT

Figure 1:
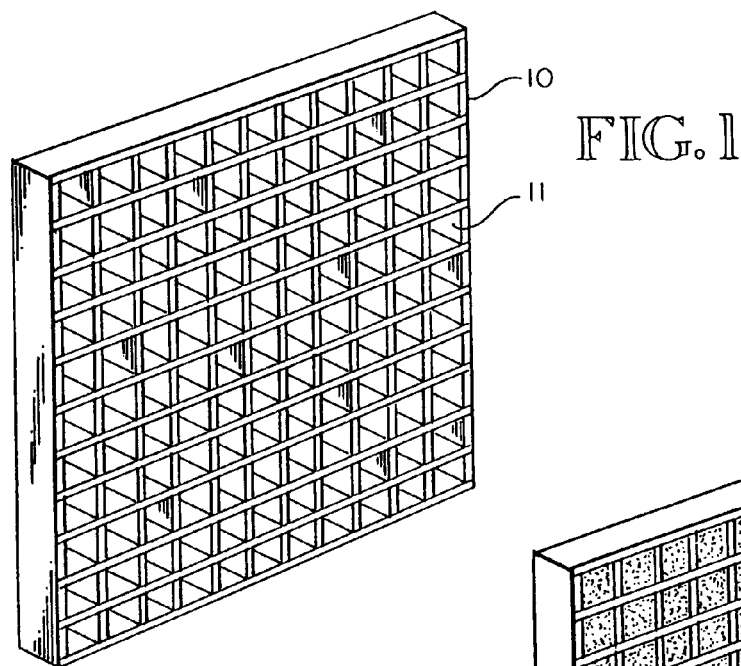
FIG. 1 is a pictorial view of a hollow celled core.
Figure 2:
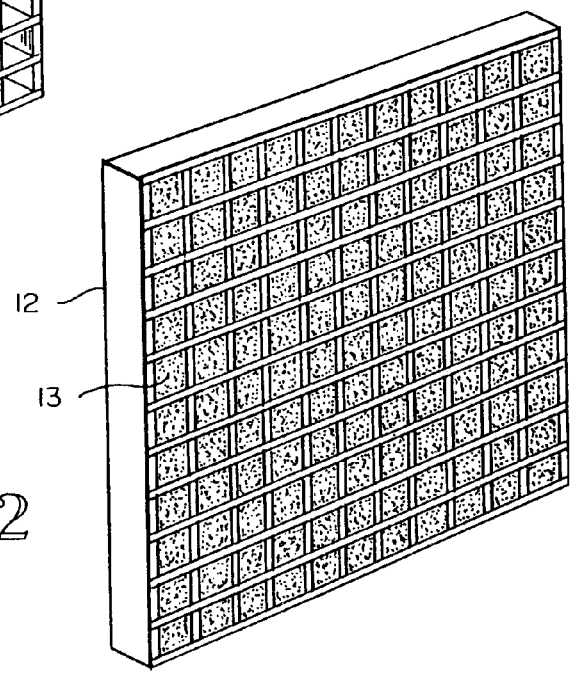
FIG. 2 is a pictorial view of a filled cell core.

The subject invention is a method of making structural cellular cores. FIG. 1 illustrates a hollow cellular core 10 with hollow (non-filled) cells, cell 11 being typical. FIG. 2 illustrates a filled cell core 12. The cells, cell 13 being typical, are filled with any of a variety of materials, foam plastic being a typical example.

Figure 3:
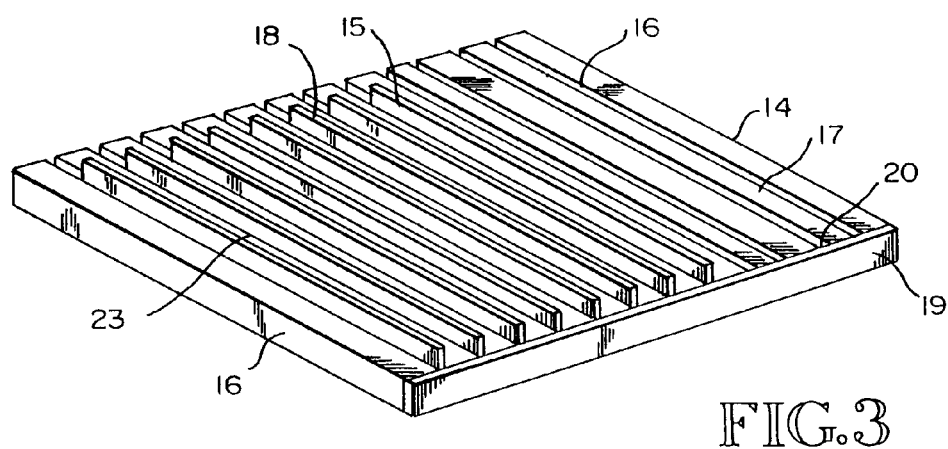
FIG. 3 illustrates a rib holding fixture with some ribs being held.

FIGS. 3 through 9 illustrate assemblages used in implementing the subject method. FIG. 3 illustrates a rib holding fixture 14 holding some ribs, rib 15 being typical. The fixture comprises a flat block 16 of suitable material, wood for example, having a plurality of slits, slit 16 being typical, in one of the blocks broad surfaces 17. The ribs, rib 18 being typical, are elongated, thin strips of material, wood for example. The width of the strips is greater than the depth of the slits so that when the ribs are seated in the slits, the ribs protrude from the slitted surface. Stop piece 19 closes off the ends, end 20 being typical, of the slits and serves to position the ribs evenly lengthwise.

Figure 4:
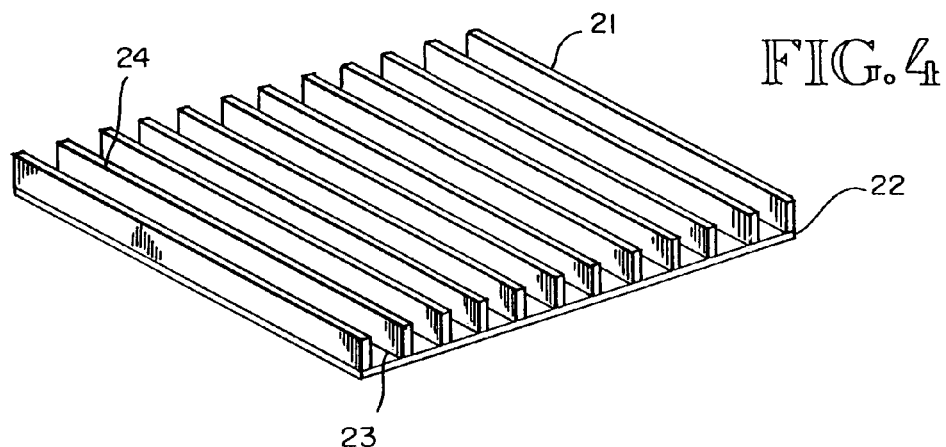
FIG. 4 illustrates a hollow ribbed ply.

FIG. 4 illustrates a hollow ribbed ply 21, made by adhesively attaching ply 22 to the exposed edges, edge 23 being typical, of ribs situated in the fixture. Each of the ribs has a free edge, edge 24 being typical.

Figure 5:
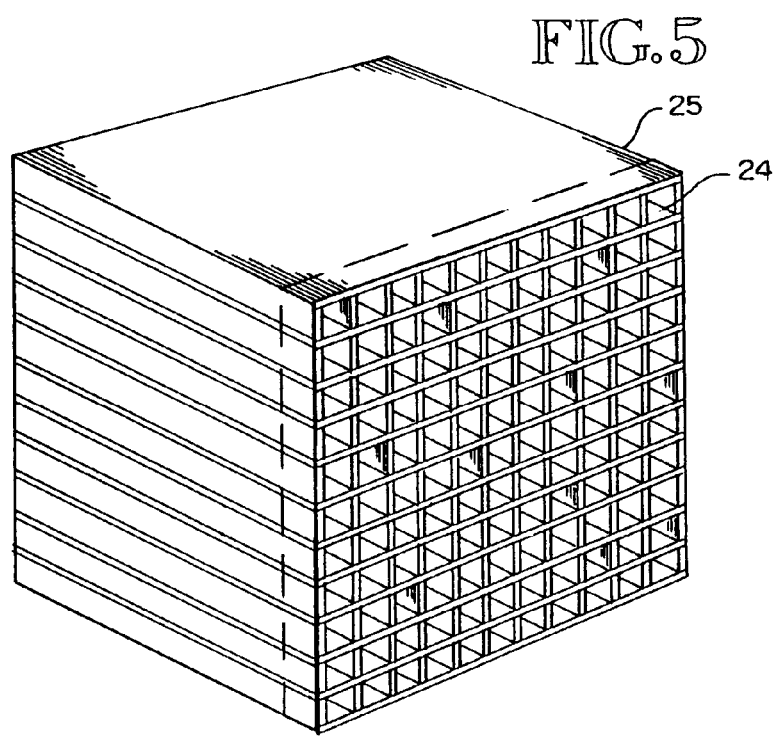
FIG. 5 illustrates a stack of hollow ribbed plies.

FIG. 5 illustrates a stack 25 of hollow ribbed piles. The stack is made by adhesively attaching hollow ribbed plies together with free edges, free edge 24, FIG. 4 being typical, attached to the plies of adjacent hollow ribbed plies. Hollow cellular cores, FIG. 1, are made by slicing them from the stack of hollow ribbed plies perpendicular to the ribs in the stack, as indicated by the dashed lines.

Figure 6:
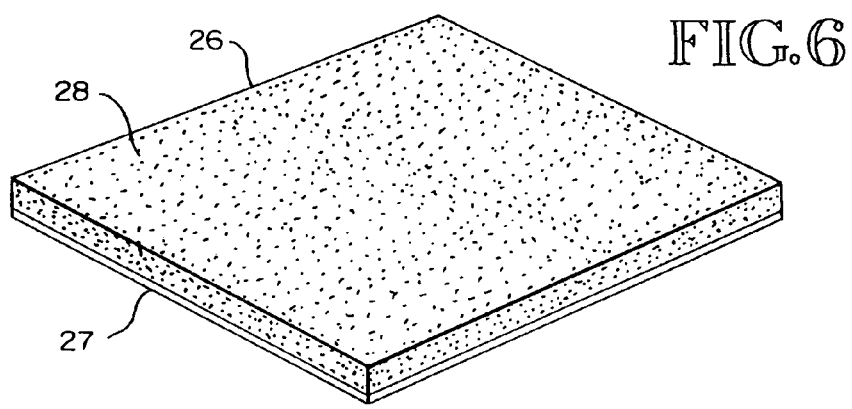
FIG. 6 illustrates a filler/ply component.

FIG. 6 illustrates a filler ply assemblage 26 which is made by adhesively attaching ply 27 to filler material 28, a sheet of material, foam plastic for example, which will ultimately fill the cells of the filled cellular cores.

Figure 7:
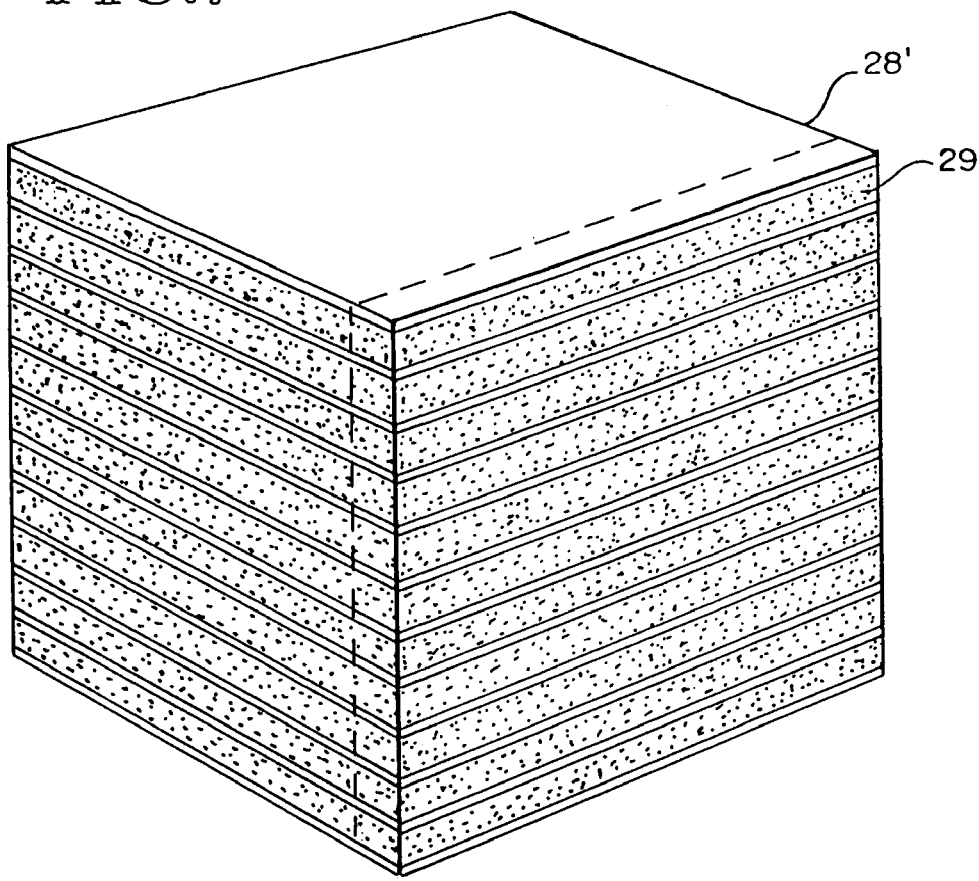
FIG. 7 illustrates a stack of filler/ply components adhesively attached.

FIG. 7 illustrates a stack 28 of filler ply components, component 29 being typical, adhesively attached to each other such that plies and filler sheets are interspersed.

Figure 8:
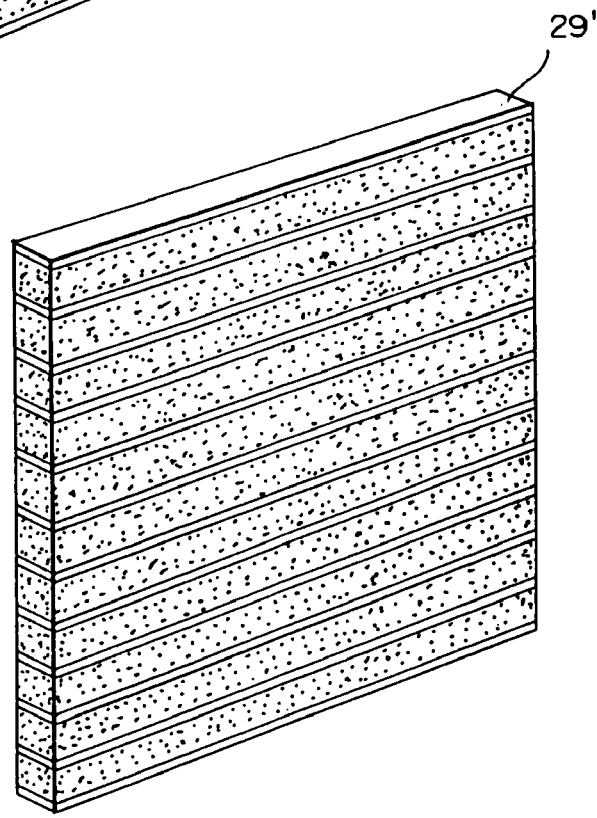
FIG. 8 illustrates a filled rib slice.

FIG. 8 illustrates a filled rib slice 29 made by slicing the filler ply component stack perpendicular to the ribs, as indicated by the dashed lines in FIG. 7.

Figure 9:
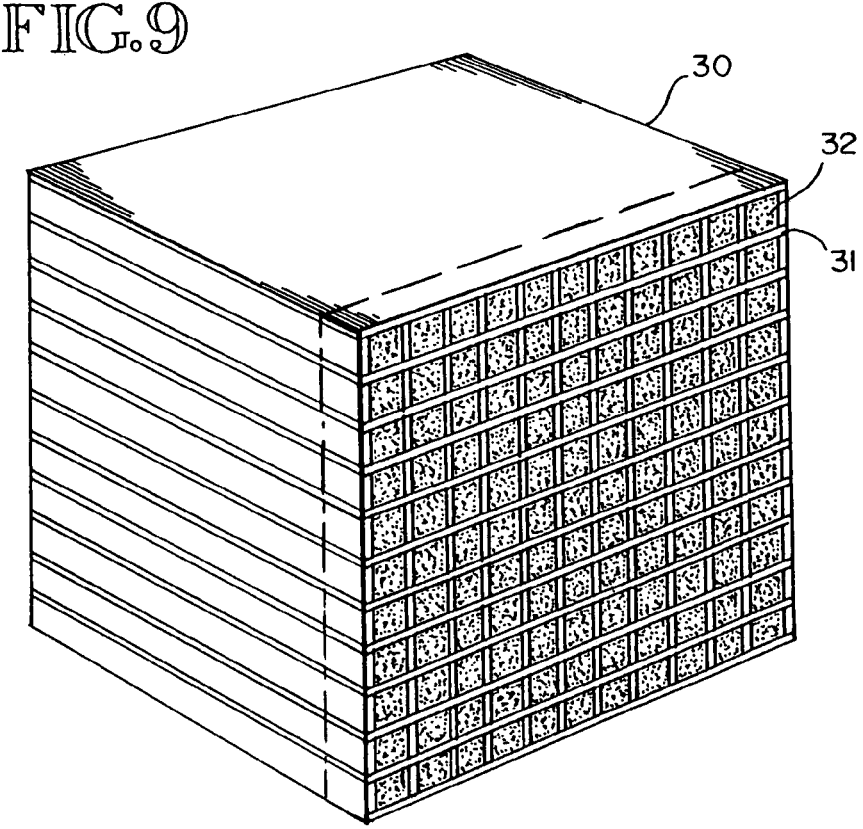
FIG. 9 illustrates a stack of piles and filled rib slices adhesively attached and stacked alternately.

FIG. 9 illustrates a stack 30 of adhesively attached plies, ply 31 for example, and filled rib slices, slice 32 for example, the plies being interspersed between the slices. A filled cell core (13, FIG. 2) is made by slicing the stack of filled rib slices and plies perpendicular to the ribs, as indicated by the dashed lines.

Figure 10:
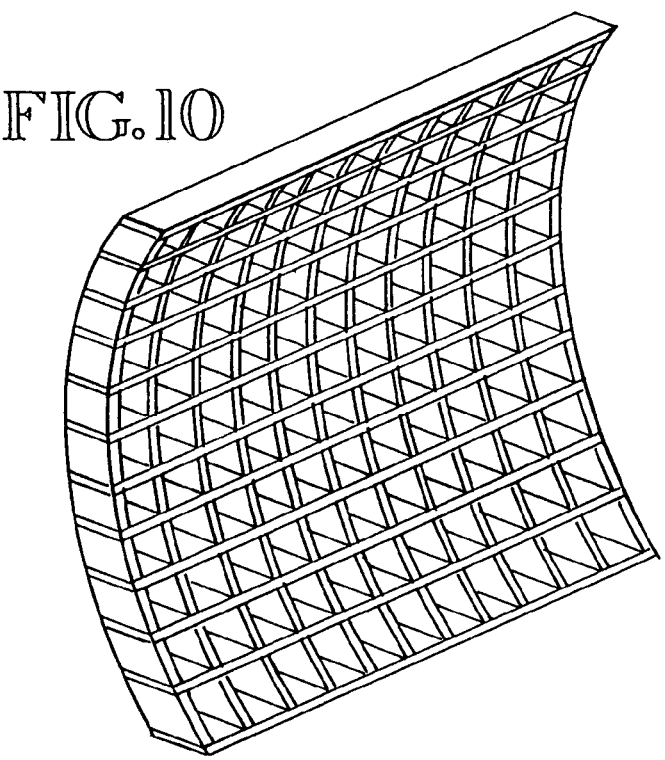
FIG. 10 illustrates a curved cellular core.

FIG. 10 illustrates a curved cellular core, made by curved cuts to slice off cellular cores.

The basic method of making cellular cores suitable to use of wood comprises the steps of:

1) providing a plurality of ribbed plies, the ribs of the ribbed plies having free edges;

2) creating a stack of ribbed plies by adhesively attaching the plurality of ribbed plies together with the ply of each ribbed ply against the free edges of an adjacent ribbed ply; and 3) creating cellular cores by cutting slices off the ribbed ply stack, cutting perpendicular to the ribs.

The method for making specifically hollow cell cellular cores comprises the steps of:

1) creating a plurality of hollow ribbed plies, FIG. 4, the ribs of each hollow ribbed ply having free edges, using the following steps:
 a) providing a plurality of plies;
 b) providing a plurality of ribs;
 c) providing a fixture for holding a plurality of ribs parallel to each other with one set of edges of the ribs in a flat plane and exposed above the fixture;
 d) installing the ribs in the fixtures;
 e) adhesively attaching a ply to the exposed edges of the ribs;
 f) allowing the adhesive used for the adhesive attachment to core; and
 g) removing the hollow ribbed ply from the fixture.

2) creating a stack of hollow ribbed plies by adhesively attaching the plurality of hollow ribbed plies together with the ply of each hollow ribbed ply against the free edges of an adjacent hollow ribbed ply; and 3) creating hollow cell cellular cores by cutting slices off the stack of hollow ribbed plies, cutting perpendicular to the ribs;

The method for making specifically a filled cell cellular core comprises the steps of:

1) providing a plurality of filled rib slices, using the following steps:
 a) providing a plurality of plies;
 b) providing a plurality of filler layers;
 c) making a stack of alternate plies and filler layers, adhesively attached to each other; and
 d) making a plurality of filled ribbed plies by slicing them from the stack, slicing perpendicular to the ribs.
 e) providing a plurality of plies;
 f) making a stack of the plies and filled rib slices, stacked alternately with all ribs parallel and adhesively attached to each other; and
 g) slicing filled cell cellular cores from the stack, cutting perpendicular to the ribs.

It is considered that all cellular core embodiments made according to the subject methods, the intersectional joints, joint 33 for example, will be of adequate strength. However, if it is indicated that there will be unusually high loads on the intersectional joints so that additional strength is required, the intersectional joints can be strengthened by any of a number of techniques, including applying a filler of thickened adhesive to at least one of the four corners of a joint.

All adhesive attachments may be augmented or replaced by mechanical fastening such as staples, nails and screws. Such augmentation may allow handling of adhesively attached assemblages before to adhesive in fully cured.

It is considered to be understandable from the above description that the subject invention meets its objectives. It provides a method which enables economically acceptable manufacture of cellular cores made of wood. This is due in part to the fact that the method does not involve the making and handling of parts which are small relative to the size of the cellular core.

It is also considered to be understood that while certain embodiments of the subject invention are disclosed, other embodiments and modifications of those disclosed are possible within the scope of the attached claims.

What is claimed is:

1. A method of making a laminated structural member, comprising:
 providing a plurality of thin wood sheet plies, each having a first side, a second side and a grain direction;
 providing a plurality of filler sheet plies, one for each wood sheet ply, each filler sheet ply being less dense than the wood sheet ply and having a first side and a second side;
 adhesively attaching the first side of each filler sheet ply to the first side of a wood sheet ply to form a plurality of filler/wood sheets, each comprising a wood sheet ply and a filler sheet ply;
 allowing the adhesive to cure;
 forming a stack of said filler/wood sheets, and when so doing placing the second side of the filler sheet plies in contact with the second side of the wood sheet plies, with the grain of the wood sheet plies extending in the same direction, and adhesively attaching said filler/wood sheets together;

allowing the adhesive to cure;

slicing the stack parallel to the grain of the wood sheet plies, to form ribbed members formed of thin wood ribs and low density filler material between the ribs;

making a stack of the ribbed members and more thin wood sheet plies, one at the top of the stack, one at the bottom of the stack and one between each adjacent ribbed members, and arrange the grain of the wood sheet plies to extend in the same direction as the grain of the wood ribs, and adhesively securing the rib members and the wood sheet plies together;

allowing the adhesive to cure; and cutting the stack of ribbed members and wood sheet plies across the grain in the wood sheet plies, and perpendicular to the ribs, so as to create a plurality of cellular core members, each composed of wood ribs and filler material between the ribs, wherein the grain of the wood ribs extends crosswise of each core member, between a first side and a second side of the core member; and adhesively connecting a side ply member on at least the first side of said core member, said side ply member concealing the core member.

2. The method of claim 1, also comprising adhesively connecting a side member on the second side of said core member.

3. The method of claim 1, wherein the filler sheet plies are a foam material.

4. The method of claim 2, wherein the filler sheet plies are a foam material.

* * * * *